US011900901B2

(12) United States Patent
Jeune

(10) Patent No.: US 11,900,901 B2
(45) Date of Patent: Feb. 13, 2024

(54) INSTRUMENT CARRY STRAP AND SWIVEL CONNECTOR

(71) Applicant: Jose Jeune, Valley Stream, NY (US)

(72) Inventor: Jose Jeune, Valley Stream, NY (US)

( * ) Notice: Subject to any disclaimer, the term of this patent is extended or adjusted under 35 U.S.C. 154(b) by 0 days.

(21) Appl. No.: 17/664,501

(22) Filed: May 23, 2022

(65) Prior Publication Data

US 2023/0377541 A1 Nov. 23, 2023

(51) Int. Cl.
*G10G 5/00* (2006.01)

(52) U.S. Cl.
CPC .................................... *G10G 5/005* (2013.01)

(58) Field of Classification Search
CPC G10G 5/00; G10G 5/005; G10G 7/00; G10G 7/005; G10G 7/02
See application file for complete search history.

(56) References Cited

U.S. PATENT DOCUMENTS 4,014,240 A * 3/1977 Pullen .................... G10G 5/005
84/327

* cited by examiner

*Primary Examiner* — Kimberly R Lockett
(74) *Attorney, Agent, or Firm* — Dunlap Bennett & Ludwig, PLLC

(57) ABSTRACT

A versatile guitar and bass guitar strap is disclosed. This instrument carrying strap eliminates the need to detach and reattach the strap when adjustment is required for twisting, and also eliminates the wear and tear associated with having to detach and reattach the strap. A swivel connector is applied to at least one terminal end of the strap at a connection point with the instrument. The swivel connector has a first and a second rotator that are carried on an axial pin for rotational movement relative to each other. Rotator arms are configured for coupling with the strap and a connector tab.

11 Claims, 5 Drawing Sheets

INSTRUMENT CARRY STRAP AND SWIVEL CONNECTOR

BACKGROUND OF THE INVENTION

The resent invention relates to musical instruments, and more particularly to carrying straps for musical instruments.

Guitar and bass guitar straps are utilized for suspending the instrument on the musician's shoulders when playing or carrying the instrument. Due limited maneuverability, existing guitar and bass guitar straps can cause discomfort when the straps twist or do not conform to the contour of the user.

Conventional guitar straps have a first end that couples with one of the head or neck of the guitar. A second end of the guitar strap couples with the body of the instrument. While the attachment points couple the strap ends to the instrument, they do not provide a degree of rotational movement along a longitudinal length of the strap to prevent the strap from twisting and causing discomfort for the musician.

Once the strap is twisted, the musician must provide sufficient slack in the strap to straighten the strap. Alternatively, the musician may remove the instrument from their shoulders and realign the strap. The musician may also decouple the strap from the instrument and straighten the strap. In all these scenarios, the musician is otherwise unable to play the instrument while they are repositioning the strap, which would interfere with their playing, particularly during a performance.

As can be seen, there is a need for improved instrument strap that eliminates the need to detach and reattach the strap when adjustment is required for twisting, and also eliminates the wear and tear associated with having to detach and reattach the strap.

SUMMARY OF THE INVENTION

In one aspect of the present invention, a swivel connector for suspending an instrument strap from an instrument is disclosed. The swivel connector includes a first rotator having a first central hub and first rotator arms laterally extending from the hub. A second rotator has a second central hub and second rotator arms laterally extending from the second central hub. An axial pin extends through each of the first central hub and the second central hub, such that each of the first rotator and the second rotator are rotationally carried, relative to one another, on the axial pin.

In some embodiments, a head on at least one end of the axial pin is dimensioned to retain at least one of the first central hub or the second central hub on the axial shaft.

In some embodiments, a set screw is received through a lateral face of one of the first central hub and the second central hub to secure the one of the first central hub and the second central hub in a fixed condition relative the axial pin.

In some embodiments, a spacer is carried on the axial pin between the first central hub and the second central hub.

In some embodiments, the first rotator arms and the second rotator arms have a width corresponding to a width of the instrument strap.

In some embodiments, an attachment tab is formed as a length of material that is carried around at least one of first rotator arms and second rotator arms. A strap tab may also be formed as a length of material that is carried around another of the at least one of the first rotator arms and the second rotator arms.

In some embodiments, a floating link is coupled with the strap tab. The floating link is configured to adjustably carry an end loop of the instrument strap therethrough.

In some embodiments, a strap link interconnects opposed ends of the first rotator arms and a distal end of the floating link.

In other aspects of the invention, a carrying strap for a musical instrument is disclosed. The carrying strap includes an elongate strap having a first end and a second end. At least one swivel connector has a first rotator and a second rotator rotationally carried, relative to one another, on an axial pin. A strap tab is coupled with first rotator arms laterally extending from a first hub of the first rotator and an attachment tab is coupled with second rotator arms laterally extending from a second hub of the second rotator.

In some embodiments, a floating link is coupled with the strap tab, the configured to slidably receive a loop of the elongate strap to accommodate an adjustment in a longitudinal length of the elongate strap.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide an instrument strap and a swivel connector for attaching the instrument strap to the instrument to avoid twisting and bunching of the strap on the musician's shoulders. As seen in reference to the drawings of FIGS. 1-8, an instrument strap is shown coupled with a musical instrument 12, such as a guitar. In the non-limiting embodiment shown, the instrument 12 is provided with an attachment point 12A, such as a peg, at a forward end and an aft end of the instrument 12. An attachment tab 26 couples with the attachment point 12A. A swivel connector 10 is interposed between the attachment tab 26 and a terminal end of an instrument strap 12B. A buckle 36 is provided for adjusting a longitudinal length of the instrument strap 12B.

Figure 1:
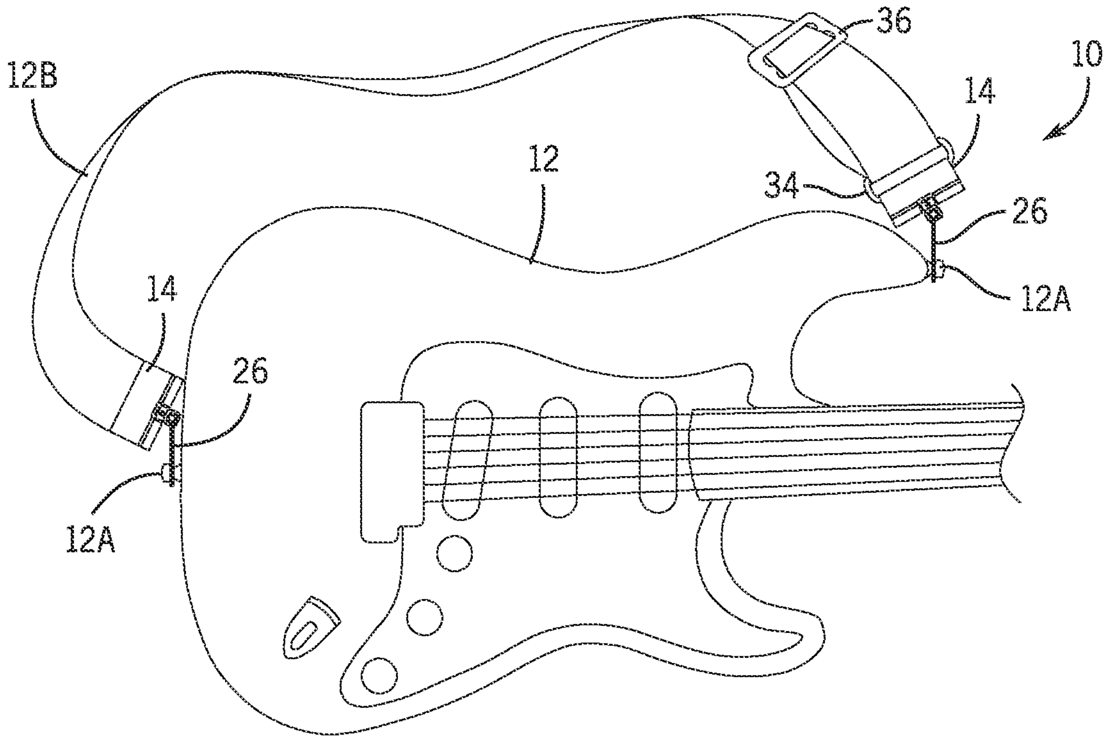
FIG. 1 is a front elevation view of the first configuration of the invention shown in use.
Figure 2:
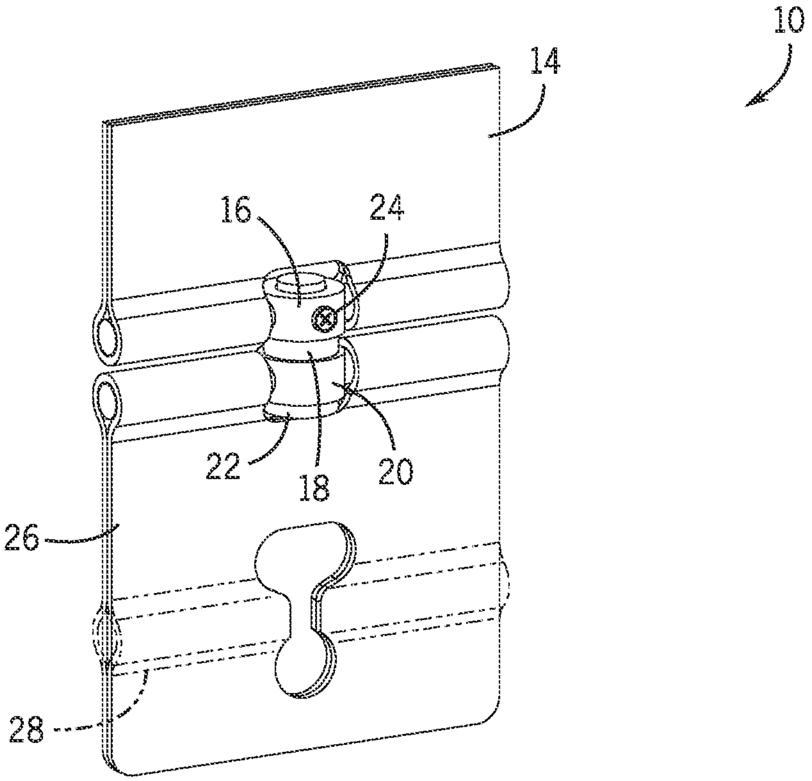
FIG. 2 is a perspective view of the first configuration of the invention.
Figure 3:
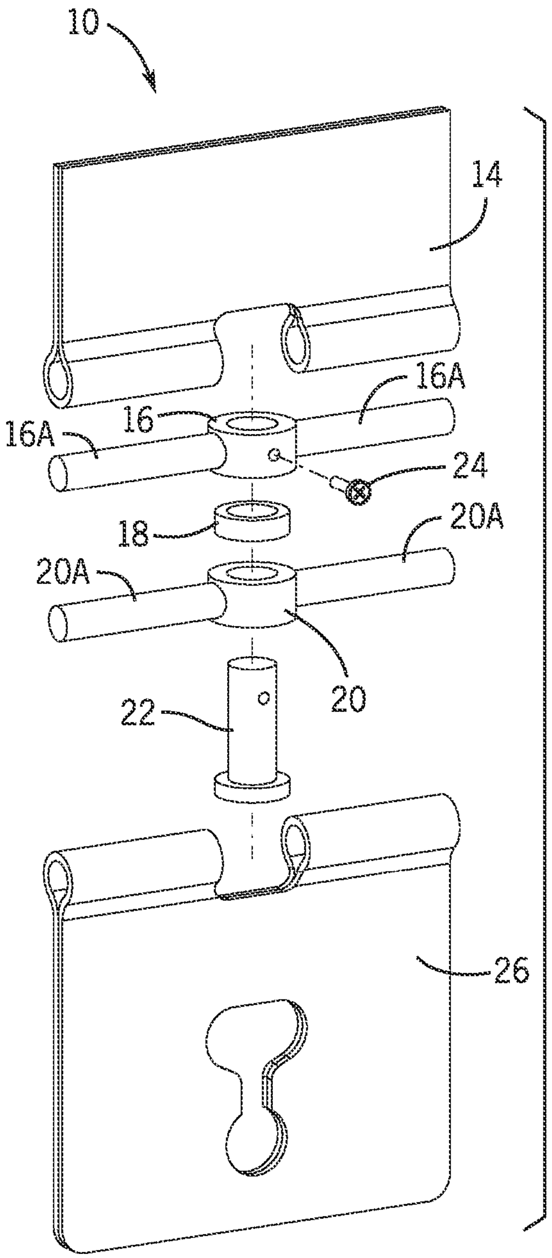
FIG. 3 is an exploded perspective view of the first configuration of the invention.
Figure 4A:
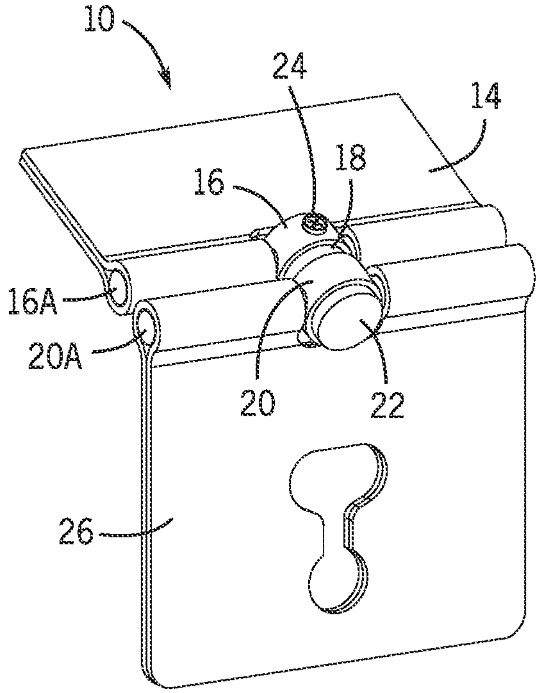
FIG. 4A is a perspective view of the first configuration of the invention shown in an example position.
Figure 4B:
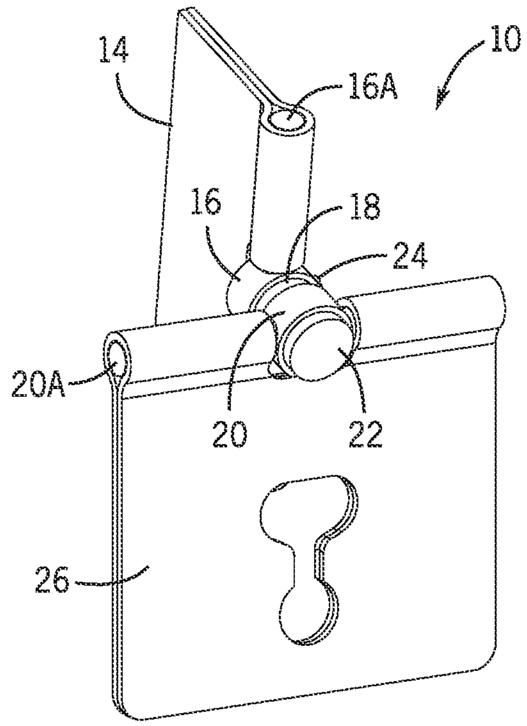
FIG. 4B is a perspective view of the first configuration of the invention shown in another example position.
Figure 4C:
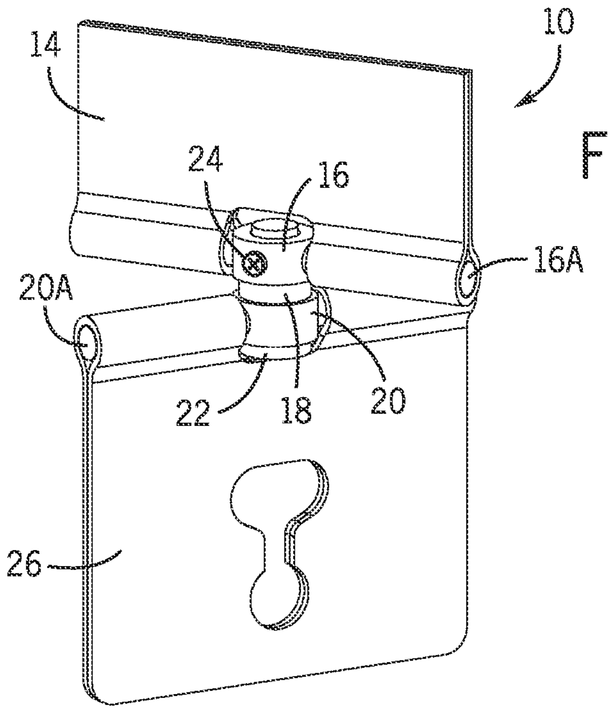
FIG. 4C is a perspective view of the first configuration of the invention shown in yet another example position.
Figure 4D:
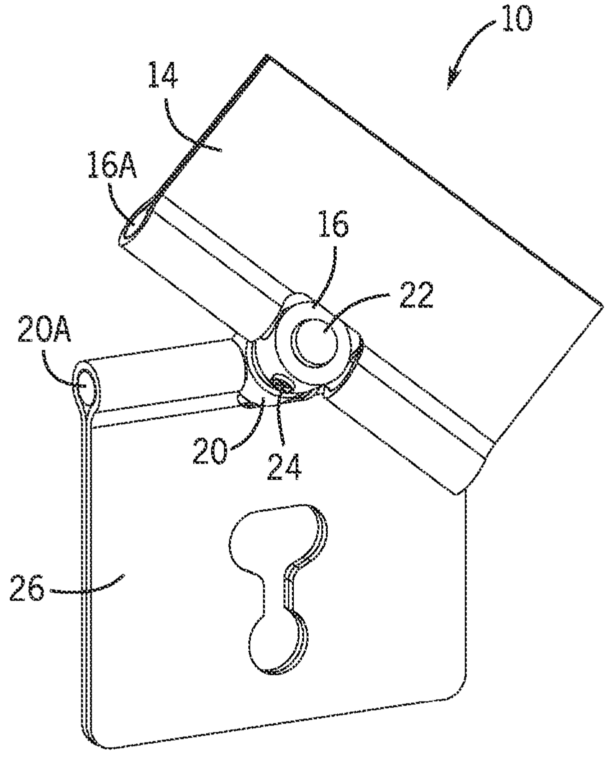
FIG. 4D is a perspective view of the first configuration of the invention shown in yet another example position.
Figure 4E:
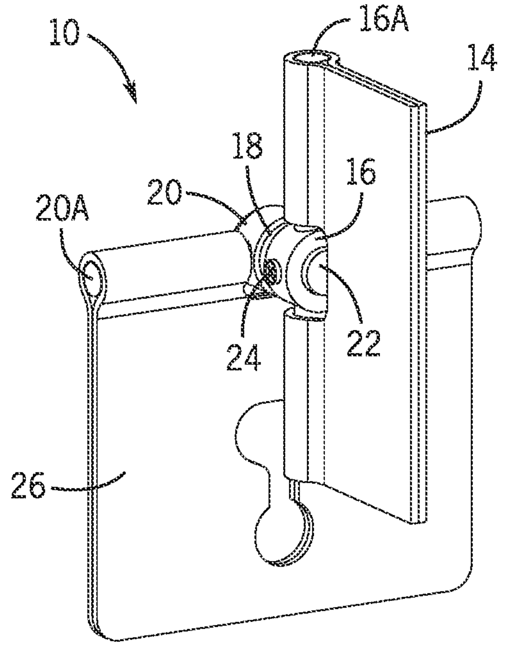
FIG. 4E is a perspective view of the first configuration of the invention shown in yet another example position.
Figure 5:
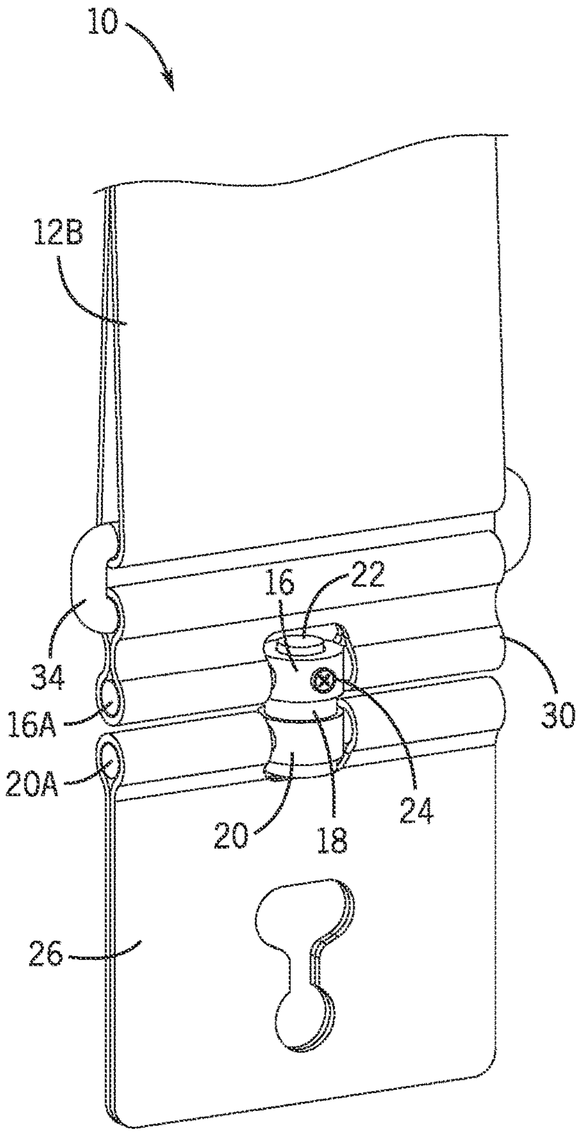
FIG. 5 is a perspective view of the invention shown in a second configuration.
Figure 6:
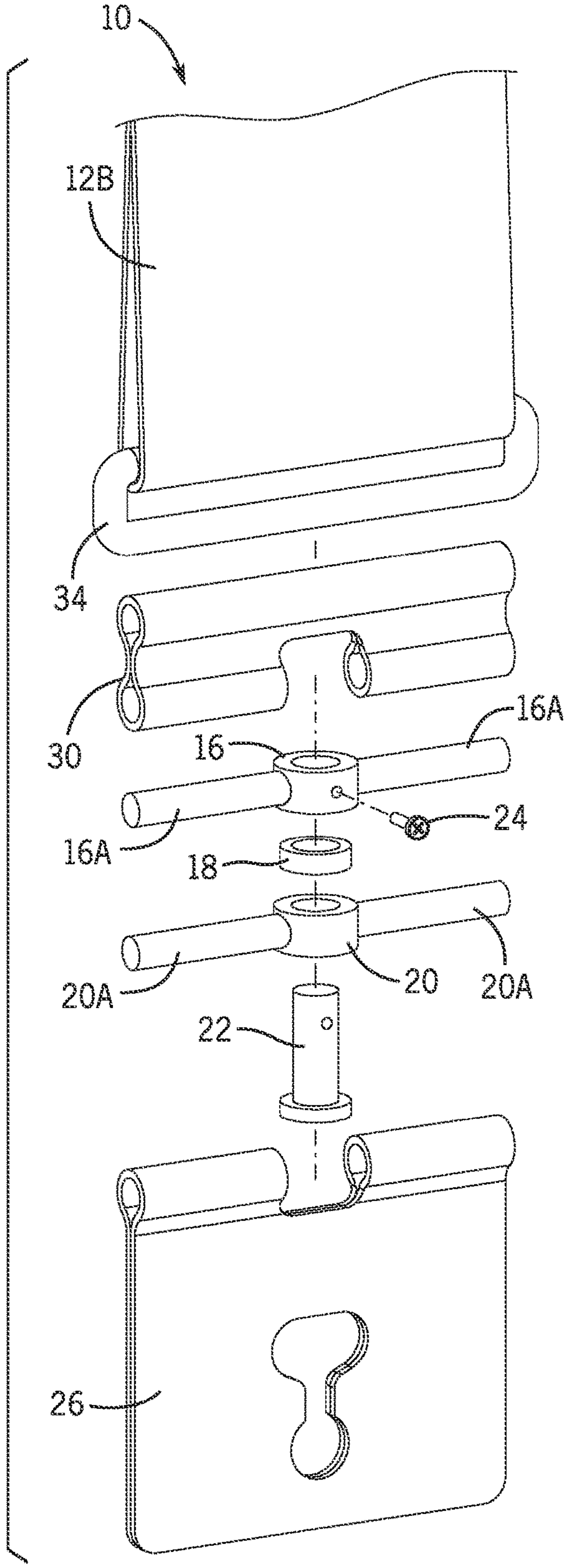
FIG. 6 is an exploded perspective view of the invention shown in a second configuration.
Figure 7:
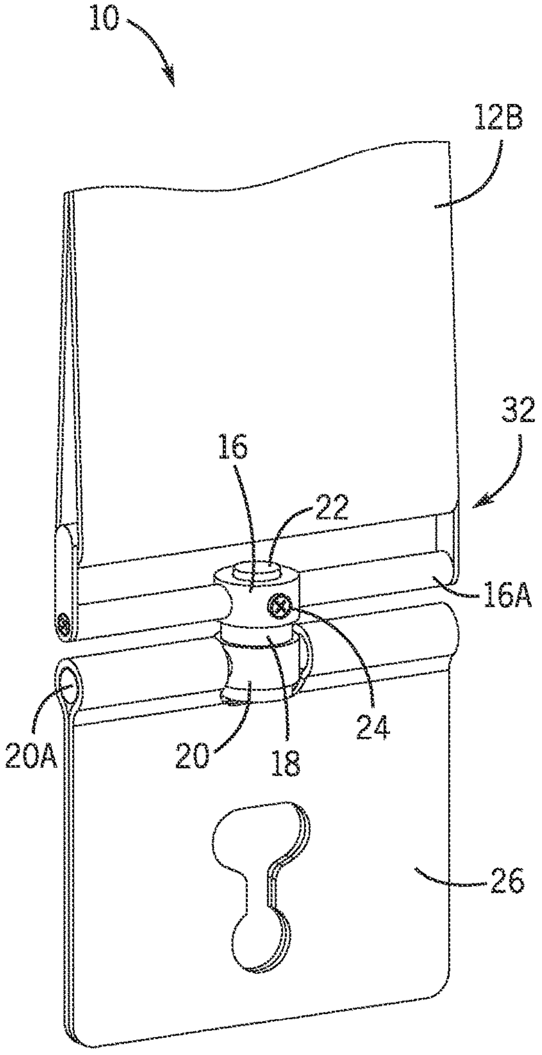
FIG. 7 is a perspective view of the invention shown in a third configuration.
Figure 8:
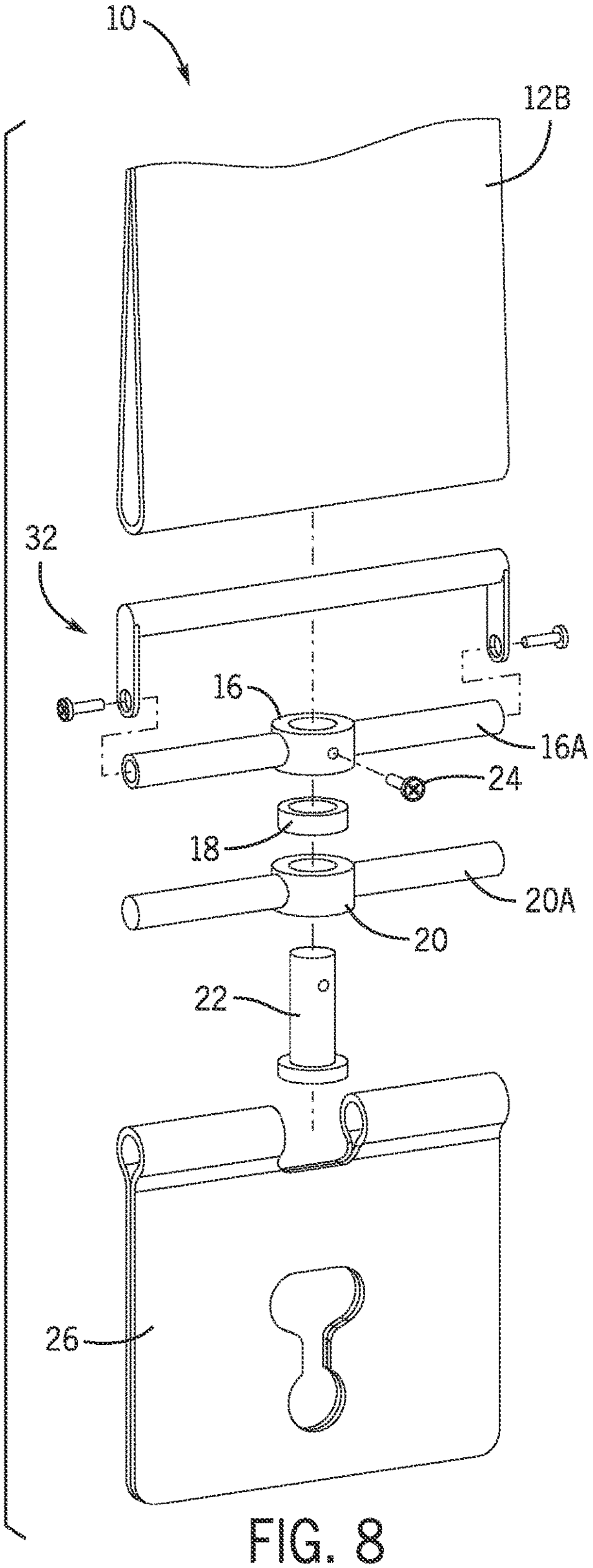
FIG. 8 is an exploded perspective view of the invention shown in a third configuration.

As seen in reference to FIGS. 5-8, the swivel connector 10 provides versatility in attachment with a corresponding terminal end of the strap 12B. In FIG. 5, a terminal end of the strap 12B may have a floating link 34 that adjustably carries an end loop of the strap 12B therethrough. A strap link 20 interconnects the first rotator 16 and a distal end of the floating link 34. The strap 12B is then able to slide through a proximal end of the floating link 34 as the musician adjusts the length of the strap 12B. In the embodiment shown in FIGS. 7 and 8, the floating link 32 includes an end link 32 that is attached to opposed ends of the first rotator arm 16A. In this embodiment, the strap 12B is adjustably carried on a proximal end of the floating link 32.

It should be understood, of course, that the foregoing relates to exemplary embodiments of the invention and that modifications may be made without departing from the spirit and scope of the invention as set forth in the following claims.

What is claimed is:

1. A swivel connector for suspending an instrument strap from an instrument, comprising:

a first rotator having a first central hub and first rotator arms laterally extending from the hub;

a second rotator having a second central hub and second rotator arms laterally extending from the hub; and an axial pin extending through each of the first central hub and the second central hub, wherein each of the first rotator and the second rotator are rotationally carried, relative to one another, on the axial pin.

2. The swivel connector of claim 1, further comprising:

a head on at least one end of the axial pin, the head dimensioned to retain at least one of the first central hub or the second central hub on an axial shaft.

3. The swivel connector of claim 2, further comprising:

a set screw received through a lateral face of one of the first central hub and the second central hub to secure the one of the first central hub and the second central hub in a fixed condition relative the axial pin.

4. The swivel connector of claim 3, further comprising:

a spacer carried on the axial pin between the first central hub and the second central hub.

5. The swivel connector of claim 4, wherein the first rotator arms and the second rotator arms have a width corresponding to a width of the instrument strap.

6. The swivel connector of claim 5, further comprising:

an attachment tab formed as a length of material that is carried around at least one of first rotator arms and second rotator arms.

7. The swivel connector of claim 6, further comprising:

a strap tab formed as a length of material that is carried around another of the at least one of the first rotator arms and the second rotator arms.

8. The swivel connector of claim 6, further comprising:

a floating link coupled with the strap tab, the floating link configured to adjustably carry an end loop of the instrument strap therethrough.

9. The swivel connector of claim 8, further comprising:

a strap link interconnecting opposed ends of the first rotator arms and a distal end of the floating link.

10. A carrying strap for a musical instrument, comprising:

an elongate strap having a first end and a second end;

at least one swivel connector having a first rotator and a second rotator rotationally carried, relative to one another, on an axial pin;

a strap tab coupled with first rotator arms laterally extending from a first hub of the first rotator; and an attachment tab coupled with second rotator arms laterally extending from a second hub of the second rotator.

11. The carrying strap of claim 10, further comprising:

a floating link coupled with the strap tab, the configured to slidably receive a loop of the elongate strap to accommodate an adjustment in a longitudinal length of the elongate strap.

* * * * *